R. HAMILTON.
EARTH-PULVERIZER.
No. 179,553. Patented July 4, 1876.
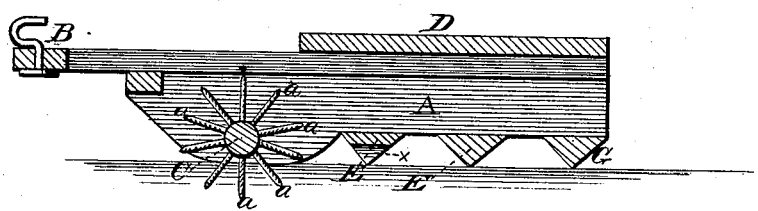
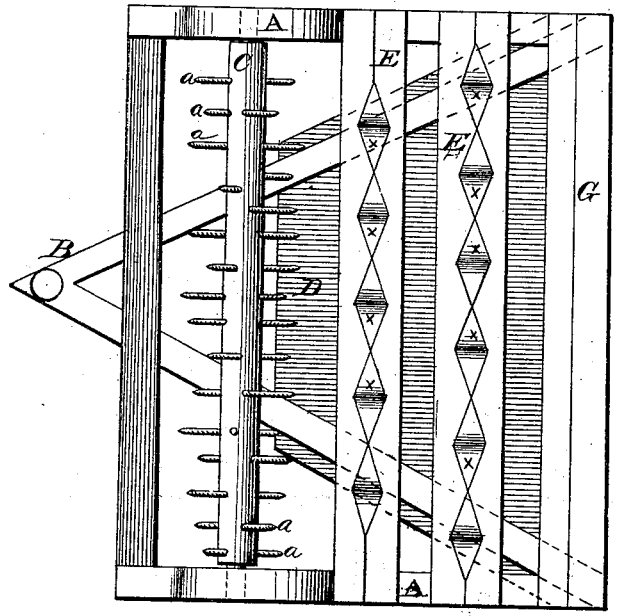
WITNESSES
Franck L. Durand
Henry N. Miller
INVENTOR
Robert Hamilton
By Alexander Mason
Attorneys

UNITED STATES PATENT OFFICE.

ROBERT HAMILTON, OF FRANKLIN, INDIANA.

IMPROVEMENT IN EARTH-PULVERIZERS.

Specification forming part of Letters Patent No. 179,553, dated July 4, 1876; application filed May 26, 1876.

*To all whom it may concern:*

Be it known that I, ROBERT HAMILTON, of Franklin, in the county of Johnson and in the State of Indiana, have invented certain new and useful Improvements in Pulverizers; and do hereby declare that the following is a full, clear, and exact description thereof, reference being had to the accompanying drawings and to the letters of reference marked thereon, making a part of this specification.

The nature of my invention consists in the construction of a harrow, as will be more fully hereinafter set forth.

To enable others skilled in the art to which my invention appertains to construct and use the same, reference is made to the accompanying drawings, making a part of this specification, in which—

Figure 1 represents a horizontal section, and Fig. 2 a bottom view, of the harrow.

A represents a rectangular frame, upon which is secured, preferably, a V-shaped tongue, B. Journaled in the forward part of this frame is a shaft, C, provided with a series of harrow rods or teeth, a a, inserted in spiral shape. Connected to the under side of the frame, in the rear of the revolving harrow-teeth, are two or more pulverizing-bars, E E, placed crosswise of the frame, and each provided with a series of alternate V-shaped depressions and projections, x x x, the projections on one bar being directly in front of the depressions of the other, as seen in Fig. 2. A short distance in the rear of these bars is a triangular bar, G, connected to the rear of the frame. Upon the top of the frame A, in the rear of the revolving harrow-teeth, is placed a board, D, for the purpose of applying a weight whenever necessary in harrowing heavy or hard ground.

In operation, the entire frame-work is drawn forward, and the teeth a a, revolving with the shaft, will break the clods of earth. The first pulverizer-bar E will crush the same, and allow the particles to pass under the depressions, on an incline, to the next bar, where they are, in turn, additionally ground, and from thence pass to the V-shaped scraping-bar G, which will grind the small clods to a fine state.

The formation of the depressions and projections on the bars E form a suction, as it were, for the clods to freely pass and be pulverized thoroughly as the harrow is moved forward.

Having thus fully described my invention, what I claim as new, and desire to secure by Letters Patent, is—

The combination of the frame A, revolving shaft C, with teeth a a, pulverizing-bars E E, formed with alternating V-shaped projections and depressions, and the triangular scraping-bar G, all constructed substantially as and for the purposes herein set forth.

In testimony that I claim the foregoing I have hereunto set my hand this 22d day of May, 1876.

ROBERT HAMILTON.

Witnesses:
 M. L. STOWELL,
 WM. L. BRAMHALL.